United States Patent
Wang et al.

(10) Patent No.: US 11,611,953 B2
(45) Date of Patent: Mar. 21, 2023

(54) NR DCI CONFIGURATION FOR UPLINK POWER TRANSMISSION

(71) Applicant: Intel Corporation, Santa Clara, CA (US)

(72) Inventors: Guotong Wang, Beijing (CN); Alexei Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 16/985,971

(22) Filed: Aug. 5, 2020

(65) Prior Publication Data

US 2020/0367217 A1    Nov. 19, 2020

Related U.S. Application Data

(60) Provisional application No. 62/887,511, filed on Aug. 15, 2019, provisional application No. 62/886,860, filed on Aug. 14, 2019.

(51) Int. Cl.
| | |
|---|---|
| *H04W 72/04* | (2009.01) |
| *H04B 7/0456* | (2017.01) |
| *H04W 52/14* | (2009.01) |
| *H04W 52/42* | (2009.01) |
| *H04L 1/00* | (2006.01) |
| *H04W 88/08* | (2009.01) |

(52) U.S. Cl.
CPC ........ *H04W 72/042* (2013.01); *H04B 7/0456* (2013.01); *H04L 1/0008* (2013.01); *H04W 52/146* (2013.01); *H04W 52/42* (2013.01); *H04W 88/08* (2013.01)

(58) Field of Classification Search
CPC . H04W 72/042; H04W 52/146; H04W 52/42; H04W 88/08; H04W 52/325; H04L 1/0008; H04L 5/0023; H04L 5/0051; H04L 5/0094; H04B 7/0456; H04B 7/0639
See application file for complete search history.

(56) References Cited

U.S. PATENT DOCUMENTS

| | | | |
|---|---|---|---|
| 2020/0266867 A1* | 8/2020 | Park ................... | H04W 52/50 |
| 2021/0320770 A1* | 10/2021 | Chen .................. | H04L 5/0053 |
| 2022/0240187 A1* | 7/2022 | Guo .................... | H04L 5/0053 |

\* cited by examiner

*Primary Examiner* — Ankur Jain
*Assistant Examiner* — Angelica Perez
(74) *Attorney, Agent, or Firm* — Schwegman Lundberg & Woessner, P.A.

(57) ABSTRACT

Systems and methods for transmission of full power uplink transmission in 5G networks are described. The gNB provides TPMI precoding information in DCI of a PDCCH in which the field size for precoding information and number of layers are fixed irrespective of the SRI. The gNB indicates in RRC signaling the use of codebook-based transmission for UL. If different SRS resources with different number of antenna ports are configured, the bitwidth of the SRI field is the maximum number of ports among the configured SRS resources in an SRS resource set with usage set to 'codebook'. If the number of ports for a configured SRS resource in the set is less than the maximum number of ports, the most significant bits of the field have a value of '0'. The bitwidth is dependent on UE coherence capabilities and a maxrank of the UE.

20 Claims, 9 Drawing Sheets

| TPMI index | $W$ (ordered from left to right in increasing order of TPMI index) | | | | | |
|---|---|---|---|---|---|---|
| 0–5 | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1\\1\end{bmatrix}$ | $\frac{1}{\sqrt{2}}\begin{bmatrix}1\\-1\end{bmatrix}$ | $\frac{1}{\sqrt{2}}\begin{bmatrix}1\\j\end{bmatrix}$ | $\frac{1}{\sqrt{2}}\begin{bmatrix}1\\-j\end{bmatrix}$ |

FIG. 3

| TPMI index | $W$ (ordered from left to right in increasing order of TPMI index) | | |
|---|---|---|---|
| 0–2 | $\frac{1}{\sqrt{2}}\begin{bmatrix}1&0\\0&1\end{bmatrix}$ | $\frac{1}{2}\begin{bmatrix}1&1\\1&-1\end{bmatrix}$ | $\frac{1}{2}\begin{bmatrix}1&1\\j&-j\end{bmatrix}$ |

FIG. 4

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 1 layer: TPMI=2 | | |
| 3 | 1 layer: TPMI=3 | | |
| 4 | 1 layer: TPMI=4 | | |
| 5 | 1 layer: TPMI=5 | | |
| 6-7 | reserved | | |

FIG. 5

| Bit field mapped to index | codebookSubset = fullyAndPartialAndNonCoherent | Bit field mapped to index | codebookSubset = nonCoherent |
|---|---|---|---|
| 0 | 1 layer: TPMI=0 | 0 | 1 layer: TPMI=0 |
| 1 | 1 layer: TPMI=1 | 1 | 1 layer: TPMI=1 |
| 2 | 2 layers: TPMI=0 | 2 | 2 layers: TPMI=0 |
| 3 | 1 layer: TPMI=2 | 3 | reserved |
| 4 | 1 layer: TPMI=3 | | |
| 5 | 1 layer: TPMI=4 | | |
| 6 | 1 layer: TPMI=5 | | |
| 7 | 2 layers: TPMI=1 | | |
| 8 | 2 layers: TPMI=2 | | |
| 9-15 | reserved | | |

FIG. 6

| Bit field mapped to index | codebookSubset = fullyAndPartialAndNonCoherent | Bit field mapped to index | codebookSubset= partialAndNonCoherent | Bit field mapped to index | codebookSubset= nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | ... | | | | |
| 3 | 1 layer: TPMI=3 | 3 | 1 layer: TPMI=3 | 3 | 1 layer: TPMI=3 |
| 4 | 1 layer: TPMI=4 | 4 | 1 layer: TPMI=4 | | |
| ... | ... | | | | |
| 11 | 1 layer: TPMI=11 | 11 | 1 layer: TPMI=11 | | |
| 12 | 1 layers: TPMI=12 | 12-15 | reserved | | |
| ... | ... | | | | |
| 27 | 1 layers: TPMI=27 | | | | |
| 28-31 | reserved | | | | |

FIG. 7

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI=0 | 0 | 1 layer: TPMI=0 | 0 | 1 layer: TPMI=0 |
| 1 | 1 layer: TPMI=1 | 1 | 1 layer: TPMI=1 | 1 | 1 layer: TPMI=1 |
| ... | | | | | |
| 3 | 1 layer: TPMI=3 | 3 | 1 layer: TPMI=3 | 3 | 1 layer: TPMI=3 |
| 4 | 2 layers: TPMI=0 | 4 | 2 layers: TPMI=0 | 4 | 2 layers: TPMI=0 |
| ... | | | | | |
| 9 | 2 layers: TPMI=5 | 9 | 2 layers: TPMI=5 | 9 | 2 layers: TPMI=5 |
| 10 | 3 layers: TPMI=0 | 10 | 3 layers: TPMI=0 | 10 | 3 layers: TPMI=0 |
| 11 | 4 layers: TPMI=0 | 11 | 4 layers: TPMI=0 | 11 | 4 layers: TPMI=0 |
| 12 | 1 layer: TPMI=4 | 12-15 | reserved | | |
| ... | | | | | |
| 19 | 1 layer: TPMI=11 | 19 | 1 layer: TPMI=11 | | |
| 20 | 2 layers: TPMI=6 | 20 | 2 layers: TPMI=6 | | |
| ... | | | | | |
| 27 | 2 layers: TPMI=13 | 27 | 2 layers: TPMI=13 | | |
| 28 | 3 layers: TPMI=1 | 28 | 3 layers: TPMI=1 | | |
| 29 | 3 layers: TPMI=2 | 29 | 3 layers: TPMI=2 | | |
| 30 | 4 layers: TPMI=1 | 30 | 4 layers: TPMI=1 | | |
| 31 | 4 layers: TPMI=2 | 31 | 4 layers: TPMI=2 | | |
| 32 | 1 layer: TPMI=12 | | | | |
| ... | | | | | |
| 47 | 1 layers: TPMI=27 | | | | |
| 48 | 2 layers: TPMI=14 | | | | |
| ... | | | | | |
| 55 | 2 layers: TPMI=21 | | | | |
| 56 | 3 layers: TPMI=3 | | | | |
| ... | | | | | |
| 59 | 3 layers: TPMI=6 | | | | |
| 60 | 4 layers: TPMI=3 | | | | |
| 61 | 4 layers: TPMI=4 | | | | |
| 62-63 | reserved | | | | |

FIG. 8

NR DCI CONFIGURATION FOR UPLINK POWER TRANSMISSION

PRIORITY CLAIM

This application claims the benefit of priority to U.S. Provisional Patent Application Ser. No. 62/886,860, filed Aug. 14, 2019, and U.S. Provisional Patent Application Ser. No. 62/887,511, filed Aug. 15, 2019, each of which is incorporated herein by reference in its entirety.

TECHNICAL FIELD

Embodiments pertain to uplink (UL) transmission in new radio (NR) or fifth generation (5G) systems. Some embodiments relate to power control for UL transmission.

BACKGROUND

The use of 3GPP networks has increased due to both an increase in the types of devices user equipment (UEs) using network resources as well as the amount of data and bandwidth being used by various applications, such as video streaming, operating on these UEs. The 5G network, which like previous generations of networks includes both a radio-access network (RAN) and a core network (CN), has been developed to answer the enormous increase in number and diversity of communication devices. In some cases, it may be desirable for UEs to transmit at full power using different power amplifier architectures. However, under certain conditions UEs may be unable to determine which codebook to use for full power transmission due to ambiguity when decoding downlink control information (DCI) in the physical downlink control channel (PDCCH) from the $5^{th}$ generation NodeB (gNB).

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 3 illustrates a precoding matrix for single-layer transmission using two antenna ports in accordance with some embodiments.

FIG. 4 illustrates a precoding matrix for two-layer transmission using two antenna ports in accordance with some embodiments.

FIG. 5 illustrates precoding information and number of layers for 2 antenna ports in accordance with some embodiments.

FIG. 6 illustrates precoding information and number of layers for 2 antenna ports in accordance with some embodiments.

FIG. 7 shows precoding information and number of layers for 4 antenna ports in accordance with some embodiments.

FIG. 8 shows precoding information and number of layers for 4 antenna ports if in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
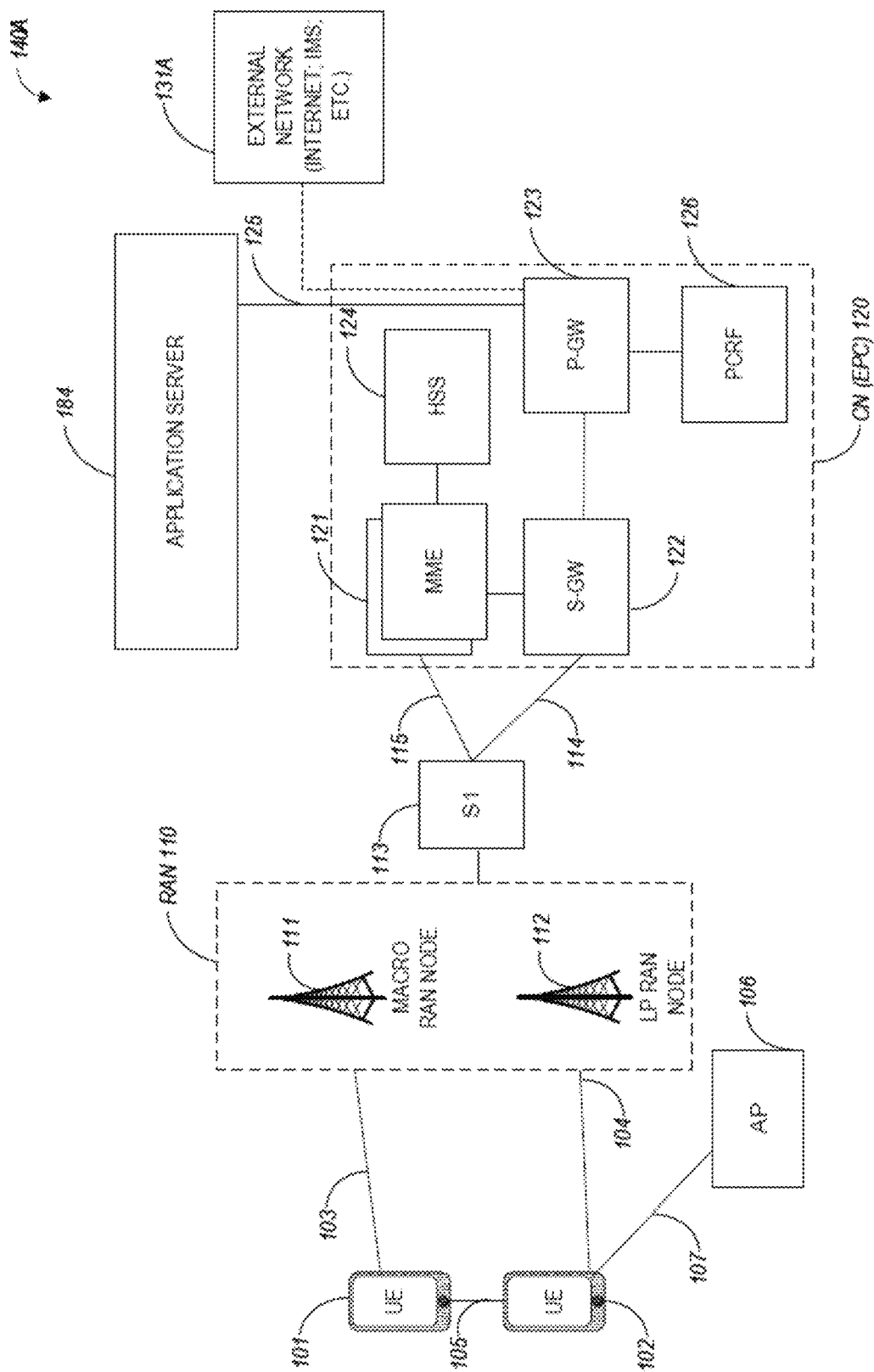
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or OFDM modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.)

to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
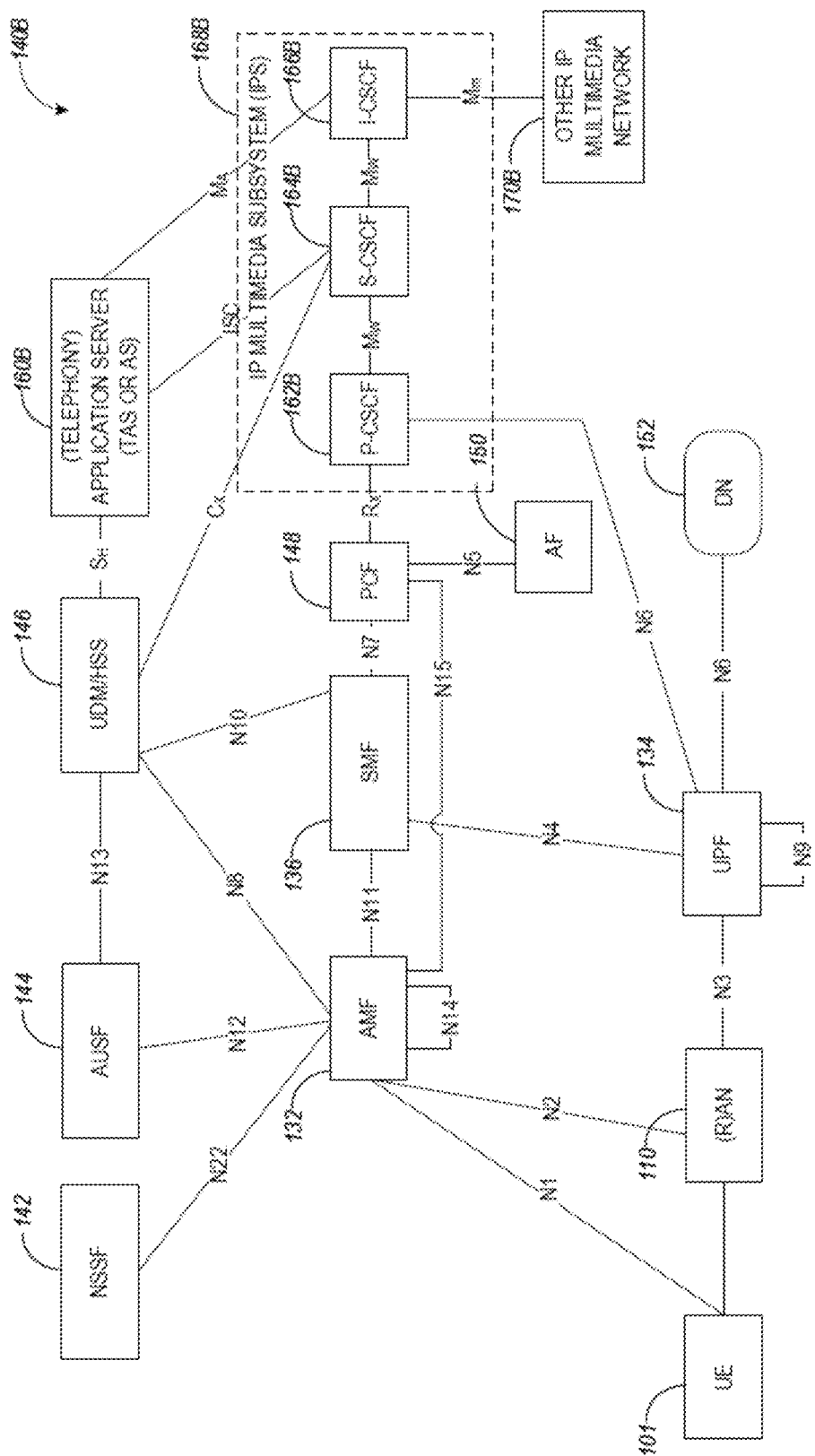
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
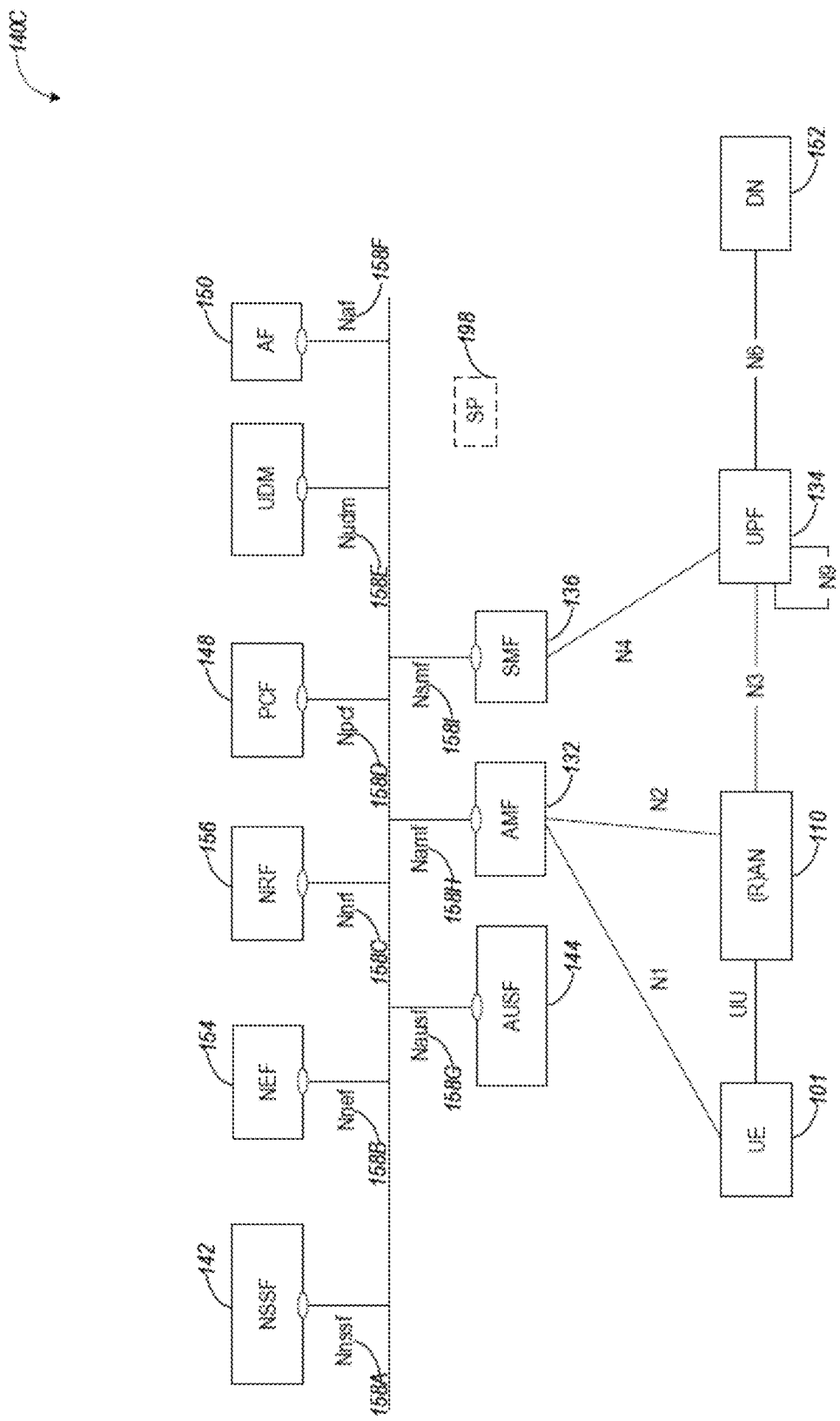
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
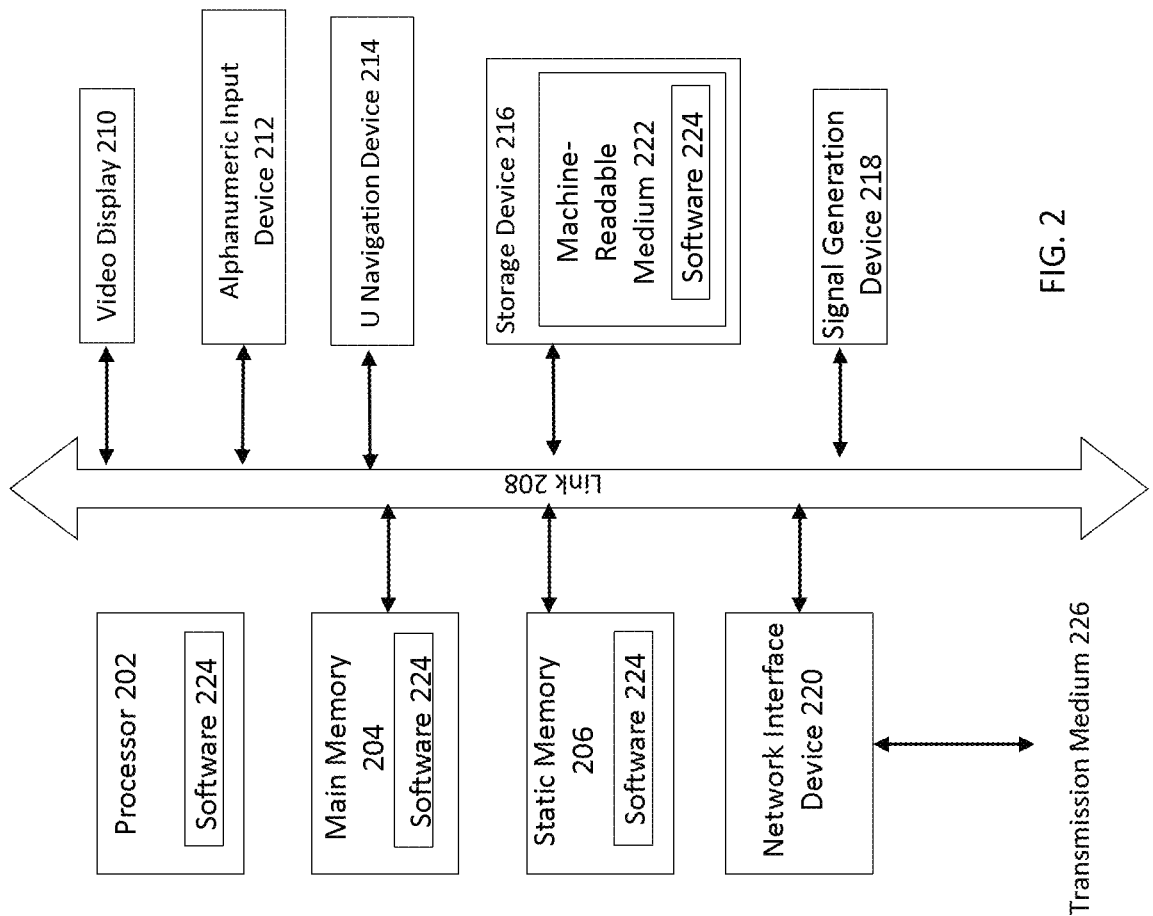
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As indicated above, in certain situations it may be desirable for a UE to transmit at full power. 5G NR Rel-15 specifies codebook-based transmission for UL. This transmission mode was designed considering different UE coherence capabilities, i.e. whether a UE can maintain the relative phase among all (full coherence), or a subset (partial coherence), or none (non-coherence) of its transmit chains/antenna ports over time.

In Rel-15, the UE may be configured to operate with a subset of precoder in the UL codebook according to the reported coherence capability. Taking a UE with two antenna ports as an example, FIGS. 3-8 show the uplink codebook and codebook subsets design in current NR Rel-15 specifications. Specifically, FIG. 3 illustrates a precoding matrix for single-layer transmission using two antenna ports in accordance with some embodiments; FIG. 4 illustrates a precoding matrix for two-layer transmission using two antenna ports in accordance with some embodiments; FIG. 5 illustrates precoding information and number of layers for 2 antenna ports in accordance with some embodiments; FIG. 6 illustrates precoding information and number of layers for 2 antenna ports in accordance with some embodiments; FIG. 7 shows precoding information and number of layers for 4 antenna ports in accordance with some embodiments; and FIG. 8 shows precoding information and number of layers for 4 antenna ports if in accordance with some embodiments.

FIGS. 3 and 4 respectively show the codebook and Transmission Precoding Matrix Index (TPMI) mapping for rank-1 and rank-2 with two antenna ports. The codebook in FIG. 4 has transform precoding disabled. FIG. 5 shows precoding information and number of layers for 2 antenna ports if the transform precoder is enabled or, if the transform precoder is disabled and maxRank=1 (i.e., a codebook subset for two antenna ports and maxRank=1). FIG. 6 shows precoding information and number of layers for 2 antenna ports if the transform precoder is disabled and maxRank=2 (i.e., codebook subset for two antenna ports and maxRank=2). FIG. 7 shows precoding information and number of layers for 4 antenna ports if the transform precoder is enabled or, if the transform precoder is disabled and maxRank=1 (i.e., a codebook subset for four antenna ports and maxRank=1); and FIG. 8 shows precoding information and number of layers for 4 antenna ports if the transform precoder is disabled and maxRank=2 or 3 or 4 (i.e., codebook subset for four antenna ports and maxRank=2 or 3 or 4).

The actual TPMI that should be used by the UE for a physical uplink shared channel (PUSCH) transmission may be indicated by the DCI (DCI 0_1) of the associated PDCCH. In order to optimize the signalling overhead, the indication of the TPMI precoder and the number of multiple input multiple output (MIMO) layers for such an uplink transmission may be indicated by the common DCI field. FIGS. 5-6 show an example of the TPMI sets defining codebook subsets for different UE coherence capabilities. Note that in the 3GPP specification, full coherence, partial coherence, and non-coherent UE capabilities are identified as 'fullAndPartialAndNonCoherent', 'partialAndNonCoherent', and 'nonCoherent'. It can be seen from FIGS. 5-8 that the number of bits for TPMI indication depends on the number of antenna ports of the UE as well as the maxRank configuration parameter.

Unfortunately, some coherence capability of the UE may not allow full power transmission. For example, for a UE with power class 3, the full transmission power is 23 dBm. If the UE has two antenna ports and power amplifiers (PAs) with the maximum transmission power of 20 dBm, the full Tx power could not be achieved for a non-coherent capable UE. More specifically for rank-1 (1 layer) only an antenna selection precoder of $$\frac{1}{\sqrt{2}}\begin{bmatrix}1\\0\end{bmatrix} \text{ or } \frac{1}{\sqrt{2}}\begin{bmatrix}0\\1\end{bmatrix}$$

is supported for rank-1 transmission, which allows transmission either from the first or the second antenna with a maximum power of 20 dBm.

In order to enable a full power uplink transmission, in NR Rel-16 defines two transmission modes for the UE power amplifier architectures: UE capability 1, UE capability 2, and UE capability 3. For UE capability 1, each PA can support full power transmission. For example, if a UE has two PAs, each PA can transmit with 23 dBm (23 dBm+23 dBm). For UE capability 2, each PA alone may be unable to deliver full power. For example, if a UE has two PAs and the maximum Tx power of each PA is 20 dBm (20 dBm+20 dBm), combining the PAs together, the full power transmission can be reached. For UE capability 3, a subset of the PAs can deliver full power. For example, if a UE has two PAs, one PA can deliver maximum power of 23 dBm and the other PA can deliver maximum power of 20 dBm (23 dBm+20 dBm).

For UE capability 1, the power control scheme may be modified to support full power transmission. For UE capability 2 and UE capability 3, two modes can be introduced for full power uplink transmission. In mode 1, the UE can be configured with one or more sounding reference signal (SRS) resources with same number of SRS ports within an SRS resource set. A new codebook subset including at least the non-antenna selection precoder may be introduced to support full power transmission, for example, $$\frac{1}{\sqrt{2}}\begin{bmatrix}1\\1\end{bmatrix}.$$

In mode 2, the UE can be configured with one SRS resource or multiple SRS resources with different numbers of SRS ports within an SRS resource set. For capability 3, the UE may report TPMI(s) to the gNB, which can enable full power transmission, for example, $$\begin{bmatrix}1\\0\end{bmatrix} \text{ or } \begin{bmatrix}0\\1\end{bmatrix}.$$

The existing Rel-15 approach for TPMI indication for mode 2 operation has some issues. Given that the UE can be configured with multiple SRS resources with different numbers of SRS antenna ports within one SRS resource set, an ambiguity exists about the number of bits used for the TPMI indication. More specifically, as can be seen from FIGS. 5-8, the bit length of the field for precoding information and number of layers in the DCI is variable, depending on the number of SRS antenna ports. Because of this ambiguity, the UE may perform blind decoding of the DCI under different assumptions. This causes excess power UE consumption and reduces PDCCH decoding performance.

Although codebook-based transmission in Rel-15 already supports two SRS resources in the SRS resource set, the above ambiguity in DCI decoding does not exist given the restriction of the same number of SRS antenna ports configuration for SRS resource within one SRS resource set. Thus, in Rel-15, for codebook-based transmission, irrespective of the SRS resource indicated by the sounding reference signal resource indicator (SRI), the UE is able to determine the length of the field of precoding information and number of layers.

For Mode 2 operation in Rel-16, the number of SRS antenna ports could be different for SRS resources within the same SRS resource set. In this case, depending on the SRI field, the number of bits for the TPMI indication could be different. Thus, the UE may be able to determine which of FIGS. 5-8 should be used only after the SRI is obtained to determine the bit length of the field for the precoding information and number of layers and derive the information of precoding TPMI and layers. This is contradictory since the actual size of field for the precoding information and number of layers should be known initially to successfully decode the DCI. For example, the gNB may configure a non-coherent UE with two SRS resources, SRS #A with two ports, SRS #B with four ports. Assuming the maximum rank is 1, if SRS #A is indicated, the table of FIG. 5 should be used, and the number of bits is 1 for the precoding information and number of layers field. If SRS #B is indicated, the table of FIG. 7 should be used, and the number of bits is 2 for the precoding information and number of layers field. Thus, ambiguity may exist for the UE to determine the actual payload size of the DCI.

To address this ambiguity, in some embodiments, padding bits may be added to the TPMI precoding information in DCI according to the maximum payload size of TPMI indication across SRS resources configured for the UE. In other embodiments, joint coding between the SRI and TPMI/number of MIMO layer precoding information may be defined. In other embodiments, the Mode 2 operation may be modified to work with the same number of SRS antenna ports for the configured SRS resources.

Padding Bits

As described above, padding bits may be added to the TPMI precoding information in DCI such that the field size for precoding information and number of layers are fixed irrespective of the SRI. The UE, after decoding the DCI, may then transmit the SRS on the indicated SRS resource(s).

In one embodiment, for the SRS resource(s) configured in the SRS resource set associated with the higher layer parameter 'usage' set to 'codebook'. The higher layer parameter may be contained in a Radio Resource Control (RRC) message. Specifically, the RRC message may contain a PUSCH-Config information element (IE) used to configure the UE specific PUSCH parameters applicable to a particular BWP. The PUSCH-Config IE may contain a txConfig IE that is present if txConfig is set to codebook and absent otherwise.

If the number of SRS antenna ports for each SRS resource are the same (including the case that only one SRS resource is configured in the SRS resource set): if the number of SRS antenna ports is 1, then the size for the field of precoding information and number of layers is 0 bits; and if the number of SRS antenna ports is larger than 1 (i.e., 2 or 4), then the size for the field of precoding information and number of layers is determined using the tables shown in FIGS. 5-8.

For the SRS resource(s) configured in the SRS resource set associated with the higher layer parameter 'usage' set to 'codebook': if the number of SRS antenna ports for the SRS resource are different, then one or more padding bits (all zeros) may be added to the field of precoding information and number of layers to guarantee that the field size is fixed for different SRS antenna ports. The actual number of the padding bits may be determined based on the maximum possible payload size of the TPMI and number of MIMO layer indication for the configured antenna ports of SRS resources.

For example, for 2 antenna ports and maximum rank of 1, the bit length for the codebook subsets 'fullAndPartialAndNonCoherent', 'partialAndNonCoherent', and 'nonCoherent' are A2, B2, C2 bits respectively (the bit length could be zero). For 4 antenna ports and maximum rank of 1, the bit length for the codebook subsets 'fullAndPartialAndNonCoherent', 'partialAndNonCoherent', and 'nonCoherent' are A4, B4, C4 bits respectively. For 1 antenna port and maximum rank of 1, the bit length for the codebook subsets 'fullAndPartialAndNonCoherent', 'partialAndNonCoherent', and 'nonCoherent' are A1, B1, C1 bits respectively (A1, B1 and C1 equals to zero).

In addition, for full power transmission, a new codebook subset may be introduced, named fullTxPower'. That is, the PUSCH-Config IE may contain an ul-FullPowerTransmission-r16 IE whose values can be taken as {fullpower, fullpowerMode1, fullpowerMode2} (which configures the UE with UL full power transmission mode). The TPMI(s) that enable the full power uplink transmission could be included in the codebook subset of 'fullTxPower'. For 2 antenna ports and maximum rank of 1, the bit length for code subset of 'fullTxPower' may be D2. For 4 antenna ports and maximum rank of 1, the bit length for code subset of 'fullTxPower' may be D4. For 1 antenna port and maximum rank of 1, the bit length for the codebook subset of 'fullTxPower' may be D1. Tables 5-8 below shows examples for the codebook subset of 'fullTxPower'.

For maximum rank of 1 (maxRank=1), the field size of precoding information and number of layers could be:

For the codebook subset of 'fullAndPartialAndNonCoherent', the bit length is A=max{A1, A2, A4}. A codebook subset with size less than A may be extended to the size of A with padding bits added.

For the codebook subset of 'partialAndNonCoherent', the bit length is B=max{B1, B2, B4}. A codebook subset with size less than B may be extended to the size of B with padding bits added.

For the codebook subset of 'nonCoherent', the bit length is C=max{C1, C2, C4}. A codebook subset with size less than C may be extended to the size of C with padding bits added.

For the codebook subset of 'fullTxPower', the bit length is D=max{D1, D2, D4}. A codebook subset with size less than D may be extended to the size of D with padding bits added.

A similar rule may be applied to the case of maximum rank of 2, 3 or 4. In other words, for maxRank=1 or maxRank=2 or 3 or 4, and for one codebook subset (from 'fullAndPartialAndNonCoherent', 'partialAndNonCoherent', 'nonCoherent' and 'fullTxPower'), the number of TPMIs for different antenna ports may be expressed as $X_i$, where i is the number of antenna ports and i=1, 2 or 4. For one antenna port, $X_1=0$. Thus, the field size of the precoding information and number of layers is determined as $\max\{\lceil \log_2(X_i)1 \rceil\}$, i=2, 4.

Tables 1-4 below each show an example of the change to the table of codebook subsets. Tables 1-2 reuse the tables shown in FIGS. 7 and 8. while Tables 3-4 are extended with padding bits (as shown in bolded italics). In this way, for the SRS resource(s) configured in the SRS resource set associated with the higher layer parameter 'usage' set to 'codebook', if the number of SRS antenna ports for the SRS resource are different, the field size of the precoding information and number of layers are determined as: If maxRank=1 (Table 2 or 4 is used) for codebook subset of 'fullAndPartialAndNonCoherent', the field size is 5 bits; for codebook subset of 'partialAndNonCoherent', the field size is 4 bits; for codebook subset of 'nonCoherent', the field size is 2 bits. If maxRank=2 or 3 or 4 (Table 1 or 3 is used): for codebook subset of 'fullAndPartialAndNonCoherent', the field size is 6 bits; for codebook subset of 'partialAndNonCoherent', the field size is 5 bits; for codebook subset of 'nonCoherent', the field size is 4 bits.

For the codebook subset of 'fullTxPower', if the number of SRS antenna ports for the SRS resource are different, the field size of the precoding information and number of layers are determined as: if maxRank=1 (Table 5 or 7 is used), for codebook subset of 'fullTxPower', the field size is $\max\{\log_2(P2+1), \log_2(R2+1)\}$ bits; if maxRank=2 or 3 or 4 (Table 6 or 8 is used) for codebook subset of 'fullTxPower', the field size is $\max\{\log_2(Q3+1), \log_2(S5+1)\}$ bits.

For Tables 3 and 4, alternatively the bit length could be zero bits for the codebook subset of 'partialAndNonCoherent', since for 2 antenna ports partial coherent is not supported.

In another example, for the codebook subsets of 'fullTxPower', the number of TPMI(s) included in the subsets are the same. Alternatively, the number of TPMI(s) included in all the codebook subsets including 'fullAndPartialAndNonCoherent', 'partialAndNonCoherent', 'nonCoherent' and 'fullTxPower' could be restricted to be the same to guarantee the field size for the precoding information and number of layers are fixed.

TABLE 1

Precoding information and number of layers, for 4 antenna ports, if transform precoder is disabled and maxRank = 2 or 3 or 4

| Bit field mapped to index | codebookSubset = fullyAndPartialAnd NonCoherent | Bit field mapped to index | codebookSubset = partialAnd NonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |

TABLE 1-continued

Precoding information and number of layers, for 4 antenna ports, if transform precoder is disabled and maxRank = 2 or 3 or 4

| Bit field mapped to index | codebookSubset = fullyAndPartialAnd NonCoherent | Bit field mapped to index | codebookSubset = partialAnd NonCoherent | Bit field mapped to index | codebookSubset = nonCoherent |
|---|---|---|---|---|---|
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

TABLE 2

Precoding information and number of layers for 4 antenna ports, if transform precoder is enabled or if transform precoder is disabled and maxRank = 1

| Bitfield mapped to index | codebookSubset = fullyAndPartialAnd NonCoherent | Bit field mapped to index | codebookSubset = partialAnd NonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12-15 | reserved | | |
| ... | ... | | | | |
| 27 | 1 layers: TPMI = 27 | | | | |
| 28-31 | reserved | | | | |

TABLE 3

Precoding information and number of layers, for 2 antenna ports, if transform precoder is disabled and maxRank = 2

| Bit field mapped to index | codebookSubset = fullyAndPartialAnd Non Coherent | Bit field mapped to index | codebookSubset = partialAnd NonCoherent | Bit field mapped to index | codebookSubset = nonCoherent |
|---|---|---|---|---|---|
| 0 | 1 layer: TPMI = 0 | 0-31 | reserved | 0 | 1 layer: TPMI = 0 |
| 1 | 1 layer: TPMI = 1 | | | 1 | 1 layer: TPMI = 1 |
| 2 | 2 layers: TPMI = 0 | | | 2 | 2 layers: TPMI = 0 |
| 3 | 1 layer: TPMI = 2 | | | 3-15 | reserved |
| 4 | 1 layer: TPMI = 3 | | | | |
| 5 | 1 layer: TPMI = 4 | | | | |
| 6 | 1 layer: TPMI = 5 | | | | |
| 7 | 2 layers: TPMI = 1 | | | | |
| 8 | 2 layers: TPMI = 2 | | | | |
| 9-63 | reserved | | | | |

TABLE 4

Precoding information and number of layers, for 2 antenna ports, if transform precoder is enabled, or if transform precoder is desabled and maxRank = 1

| Bit field mapped to index | codebookSubset = fullyAndPartialAnd NonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0-15 | reserved | 0 | 1 layer: TPMI = 0 |
| 1 | 1 layer: TPMI = 1 | | | 1 | 1 layer: TPMI = 1 |
| 2 | 1 layer: TPMI = 2 | | | 2-3 | reserved |
| 3 | 1 layer: TPMI = 3 | | | | |
| 4 | 1 layer: TPMI = 4 | | | | |
| 5 | 1 layer: TPMI = 5 | | | | |
| 6-31 | reserved | | | | |

Alternatively, the DCI overhead may be further reduced considering different combinations of different number of SRS antenna ports. If the number of SRS antenna ports include {1, 2, and 4}, then the same rule as described above by Tables 1-4 may be applied to determine the field size of the precoding information and number of layers.

TABLE 5

Example of codebook subset of 'fullTxPower', for 2 antenna ports, if transform precoder is enabled, or if transform precoder is disabled and maxRank = 1

| Bit field mapped to index | codebookSubset = fullTxPower |
|---|---|
| 0 | 1 layer: TPMI = a1 |
| ... | ... |
| P1 | 1 layer: TPMI = a1N |
| P1 + 1 – P2 | reserved |

TABLE 6

Example of codebook subset of 'fullTxPower', for 2 antenna ports, if transform precoder is disabled and maxRank = 2

| Bit field mapped to index | codebookSubset = fullTxPower |
|---|---|
| 0 | 1 layer: TPMI = b1 |
| ... | ... |
| Q1 | 1 layer: TPMI = b1N |
| Q1 + 1 | 2 layers: TPMI = b2 |
| ... | ... |
| Q2 | 2 layers: TPMI = b2N |
| Q2 + 1 – Q3 | reserved |

TABLE 7

Example of codebook subset of 'fullTxPower', for 4 antenna ports, if transform precoder is enabled, or if transform precoder is disabled and maxRank = 1

| Bit field mapped to index | codebookSubset = fullTxPower |
|---|---|
| 0 | 1 layer: TPMI = c1 |
| ... | ... |
| R1 | 1 layer: TPMI = c1N |
| R1 + 1 – R2 | reserved |

TABLE 8

Example of codebook subset of 'fullTxPower', for 4 antenna ports, if transform precoder is disabled and maxRank = 2 or 3 or 4

| Bit field mapped to index | codebookSubset = fullTxPower |
|---|---|
| 0 | 1 layer: TPMI = d1 |
| ... | ... |
| S1 | 1 layer: TPMI = d1N |
| S1 + 1 | 2 layers: TPMI = d2 |
| ... | ... |
| S2 | 2 layers: TPMI = d2N |
| S2 + 1 | 3 layers: TPMI = d3 |
| ... | ... |
| S3 | 3 layers: TPMI = d3N |
| S3 + 1 | 4 layers: TPMI = d4 |
| ... | ... |
| S4 | 4 layers: TPMI = d4N |
| 54 + 1 – S5 | reserved |

SRS Antenna Ports={1, 2, 4} (The Size is $\text{Max}\{\lceil \log_2(X_i) \rceil\}$, i=2, 4)

If maxRank=1 (Table 2 or 4 is used), for the codebook subset of 'fullAndPartialAndNonCoherent', the field size is 5 bits; for the codebook subset of 'partialAndNonCoherent', the field size is 4 bits; for the codebook subset of 'nonCoherent', the field size is 2 bits. If maxRank=2 or 3 or 4 (Table 1 or 3 is used): for codebook subset of 'fullAndPartialAndNonCoherent', the field size is 6 bits; for codebook subset of 'partialAndNonCoherent', the field size is 5 bits; for codebook subset of 'nonCoherent', the field size is 4 bits. For the codebook subset of 'fullTxPower', if maxRank=1 (Table 5 or 7 is used), the field size is $\max\{\log_2(P2+1), \log_2(R2+1)\}$ bits; if maxRank=2 or 3 or 4 (Table 6 or 8 is used), the field size is $\max\{\log_2(Q3+1), \log_2(S5+1)\}$ bits.

If the number of antenna ports include {1 and 2}, then the field size of the precoding information and number of layers is as below.

SRS Antenna Ports={1, 2} (The Size is $\lceil \log_2(X_2) \rceil$)

If maxRank=1 (the table in FIG. 5 is used): for the codebook subset of 'fullAndPartialAndNonCoherent', the field size is 3 bits; for the codebook subset of 'partialAndNonCoherent', the field size is 0 bits; for the codebook subset of 'nonCoherent', the field size is 1 bit. If maxRank=2 (the table in FIG. 6 is used): for the codebook subset of 'fullAndPartialAndNonCoherent', the field size is 4 bits; for the codebook subset of 'partialAndNonCoherent', the field size is 0 bits; for the codebook subset of 'nonCoherent', the field size is 2 bits. For the codebook subset of 'fullTx-Power': if maxRank=1 (Table 5 is used), the field size is $\log_2(P2+1)$ bits; If maxRank=2 or 3 or 4 (Table 6 is used), the field size is $\log_2(Q3+1)$ bits.

If the number of antenna ports include {1 and 4}, then the field size of the precoding information and number of layers is as below.

SRS Antenna Ports={1, 4} (The Size is $\lceil\log_2(X_4)\rceil$)

If maxRank=1 (the table in FIG. 7 is used): for the codebook subset of 'fullAndPartialAndNonCoherent', the field size is 5 bits; for the codebook subset of 'partialAndNonCoherent', the field size is 4 bits; and for the codebook subset of 'nonCoherent', the field size is 2 bits. If maxRank=2 or 3 or 4 (the table in FIG. 8 is used): for the codebook subset of 'fullAndPartialAndNonCoherent', the field size is 6 bits; for the codebook subset of 'partialAndNonCoherent', the field size is 5 bits; and for the codebook subset of 'nonCoherent', the field size is 4 bits. For the codebook subset of 'fullTxPower': if maxRank=1 (Table 7 is used), the field size is $\log_2(R2+1)$ bits; and if maxRank=2 or 3 or 4 (Table 8 is used), the field size is $\log_2(S5+1)$ bits.

If the number of antenna ports include {2 and 4}, then the field size of the precoding information and number of layers is as below.

SRS Antenna Ports={2, 4} (The Size is $\max\{\lceil\log_2(X_i)\rceil\}$, i=2, 4)

If maxRank=1 (Table 2 or 4 is used): for the codebook subset of 'fullAndPartialAndNonCoherent', the field size is 5 bits; for the codebook subset of 'partialAndNonCoherent', the field size is 4 bits; and for the codebook subset of 'nonCoherent', the field size is 2 bits. If maxRank=2 or 3 or 4 (Table 1 and Table 3 are used) for the codebook subset of 'fullAndPartialAndNonCoherent', the field size is 6 bits; for the codebook subset of 'partialAndNonCoherent', the field size is 5 bits; and for the codebook subset of 'nonCoherent', the field size is 4 bits. For the codebook subset of 'fullTxPower': if maxRank=1 (Table 5 or 7 is used are used), the field size is $\max\{\log_2(P2+1), \log_2(R2+1)\}$ bits; and If maxRank=2 or 3 or 4 (Table 6 or 8 is used), the field size is $\max\{\log_2(Q3+1), \log_2(S5+1)\}$ bits.

Thus, when the RRC message includes the PUSCH-Config IE, which contains the txConfig IE=codebook, if different SRS resources with different number of antenna ports are configured, the bitwidth may be determined according to the maximum number of ports in an SRS resource among the configured SRS resources in an SRS resource set with usage set to 'codebook'. If the number of ports for a configured SRS resource in the set is less than the maximum number of ports in an SRS resource among the configured SRS resources, a number of most significant bits with value set to '0' may be inserted to the field.

Joint Encoding

In some embodiments, the SRI field and the field of the precoding information and number of layers may be jointly encoded. In an embodiment, for the SRS resource(s) configured in the SRS resource set associated with the higher layer parameter 'usage' set to 'codebook', if the number of SRS antenna ports for the SRS resource are different, the SRI field and the field of the precoding information and number of layers could be jointly encoded in the DCI. The encoding rule depends on the combinations of different number of SRS antenna ports.

If the number of SRS resources is 2 and the number of SRS antenna ports include {1, 2}, then the joint encoding of SRI and precoding information and number of layers is as below.

Two SRS Resources and SRS Antenna Ports={1, 2}

The SRI can implicitly indicate the number of antenna ports. For example, SRI #0 is associated with SRS resource with 1 antenna port and SRI #1 is associated with SRS resource with 2 antenna ports. If maxRank=1 (Table 9 is introduced): for codebook subset of 'fullAndPartialAndNonCoherent', the field size is 3 bits; for codebook subset of 'nonCoherent', the field size is 2 bits. If maxRank=2 (Table 10 is introduced): for codebook subset of 'fullAndPartialAndNonCoherent', the field size is 4 bits; and for codebook subset of 'nonCoherent', the field size is 2 bits.

TABLE 1

Joint encoding for SRI and precoding information and number of layers, for 2 SRS resource with antenna ports {1, 2}, if transform precoder is enabled, or if transform precoder is disabled and maxRank = 1

| Bit field mapped to index | codebookSubset = fullyAndPartialAndNonCoherent | Bit field mapped to index | codebookSubset = nonCoherent |
|---|---|---|---|
| 0 | SRI = 0 | 0 | SRI = 0 |
| 1 | SRI = 1, 1 layer TPMI = 0 | 1 | SRI = 1, 1 layer: TPMI = 0 |
| 2 | SRI = 1, 1 layer TPMI = 1 | 2 | SRI = 1, 1 layer: TPMI = 1 |
| 3 | SRI = 1, 1 layer TPMI = 2 | 3 | reserved |
| 4 | SRI = 1, 1 layer TPMI = 3 | | |
| 5 | SRI = 1, 1 layer TPMI = 4 | | |
| 6 | SRI = 1, 1 layer TPMI = 5 | | |
| 7 | reserved | | |

TABLE 2

Joint encoding for SRI and precoding information and number of layers, for 2 SRS resource with antenna ports {1, 2}, if transform precoder is disabled and maxRank = 2

| Bit field mapped to index | codebookSubset = fullyAndPartialAndNonCoherent | Bit field mapped to index | codebookSubset = nonCoherent |
|---|---|---|---|
| 0 | SRI = 0 | 0 | SRI = 0 |
| 1 | SRI = 1, 1 layer: TPMI = 0 | 1 | SRI = 1, 1 layer TPMI = 0 |
| 2 | SRI = 1, 1 layer: TPMI = 1 | 2 | SRI = 1, 1 layer TPMI = 1 |
| 3 | SRI = 1, 2 layers: TPMI = 0 | 3 | SRI = 1, 2 layers: TPMI = 0 |
| 4 | SRI = 1, 1 layer: TPMI = 2 | | |
| 5 | SRI = 1, 1 layer: TPMI = 3 | | |
| 6 | SRI = 1, 1 layer: TPMI = 4 | | |
| 7 | SRI = 1, 1 layer: TPMI = 5 | | |
| 8 | SRI = 1, 2 layers: TPMI = 1 | | |
| 9 | SRI = 1, 2 layers: TPMI = 2 | | |
| 10-15 | reserved | | |

If the number of SRS resources is 2 and the number of SRS antenna ports include {1, 4}, then the joint encoding of SRI and precoding information and number of layers is as below.

Two SRS Resources and SRS Antenna Ports={1, 4}

The SRI can implicitly indicate the number of antenna ports. For example, SRI #0 is associated with an SRS resource with 1 antenna port and SRI #1 is associated with an SRS resource with 4 antenna ports.

If maxRank=1 (Table 11 is introduced): for codebook subset of 'fullAndPartialAndNonCoherent', the field size is 5 bits; for codebook subset of 'partialAndNonCoherent', the field size is 4 bits; and for codebook subset of 'nonCoherent', the field size is 3 bits. If maxRank=2 or 3 or 4 (Table 12 is introduced): for codebook subset of 'fullAndPartialAndNonCoherent', the field size is 6 bits; for codebook subset of 'partialAndNonCoherent', the field size is 6 bits; and for codebook subset of 'nonCoherent', the field size is 4 bits.

TABLE 3

Joint encoding for SRI and precoding information and number of layers, for 2 SRS resource with antenna ports {1, 4}, if transform precoder is enabled, or if transform precoder is disabled and maxRank = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | SRI = 0 | 0 | SRI = 0 | 0 | SRI = 0 |
| 1 | SRI = 0, 1 layer: TPMI = 0 | 1 | SRI = 0, 1 layer: TPMI = 0 | 1 | SRI = 0, 1 layer: TPMI = 0 |
| 2 | SRI = 0, 1 layer: TPMI = 1 | 2 | SRI = 0, 1 layer: TPMI = 1 | 2 | SRI = 0, 1 layer: TPMI = 1 |
| ... | ... | ... | ... | ... | ... |
| 4 | SRI = 0, 1 layer: TPMI = 3 | 4 | SRI = 0, 1 layer: TPMI = 3 | 4 | SRI = 0, 1 layer: TPMI = 3 |
| 5 | SRI = 0, 1 layer: TPMI = 4 | 5 | SRI = 0, 1 layer: TPMI = 4 | 5-7 | reserved |
| ... | ... | ... | ... | | |
| 12 | SRI = 0, 1 layer: TPMI = 11 | 12 | SRI = 0, 1 layer: TPMI = 11 | | |
| 13 | SRI = 0, 1 layers: TPMI = 12 | 13-15 | reserved | | |
| ... | ... | | | | |
| 28 | SRI = 0, 1 layers: TPMI = 27 | | | | |
| 29-31 | reserved | | | | |

TABLE 4

Joint encoding for SRI and precoding information and number of layers, for 2 SRS resource with antenna ports {1, 4}, if transform precoder is disabled and maxRank = 2 or 3 or 4

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | SRI = 0 | 0 | SRI = 0 | 0 | SRI = 0 |
| 1 | 1 layer: TPMI = 0 | 1 | 1 layer: TPMI = 0 | 1 | 1 layer: TPMI = 0 |
| 2 | 1 layer: TPMI = 1 | 2 | 1 layer: TPMI = 1 | 2 | 1 layer: TPMI = 1 |
| ... | ... | ... | ... | ... | ... |
| 4 | 1 layer: TPMI = 3 | 4 | 1 layer: TPMI = 3 | 4 | 1 layer: TPMI = 3 |
| 5 | 2 layers: TPMI = 0 | 5 | 2 layers: TPMI = 0 | 5 | 2 layers: TPMI = 0 |
| ... | ... | ... | ... | ... | ... |
| 10 | 2 layers: TPMI = 5 | 10 | 2 layers: TPMI = 5 | 10 | 2 layers: TPMI = 5 |
| 11 | 3 layers: TPMI = 0 | 11 | 3 layers: TPMI = 0 | 11 | 3 layers: TPMI = 0 |
| 12 | 4 layers: TPMI = 0 | 12 | 4 layers: TPMI = 0 | 12 | 4 layers: TPMI = 0 |
| 13 | 1 layer: TPMI = 4 | 13 | 1 layer: TPMI = 4 | 13-15 | reserved |
| ... | ... | ... | ... | | |
| 20 | 1 layer: TPMI = 11 | 20 | 1 layer TPMI = 11 | | |
| 21 | 2 layers: TPMI = 6 | 21 | 2 layers: TPMI = 6 | | |
| ... | ... | ... | ... | | |
| 28 | 2 layers: TPMI = 13 | 28 | 2 layers: TPMI = 13 | | |
| 29 | 3 layers: TPMI = 1 | 29 | 3 layers: TPMI = 1 | | |
| 30 | 3 layers: TPMI = 2 | 30 | 3 layers: TPMI = 2 | | |
| 31 | 4 layers: TPMI = 1 | 31 | 4 layers: TPMI = 1 | | |

TABLE 4-continued

Joint encoding for SRI and precoding information and number of layers, for 2 SRS resource with antenna ports {1, 4}, if transform precoder is disabled and maxRank = 2 or 3 or 4

| Bit field mapped to index | codebookSubset = fullyAndPartialAnd NonCoherent | Bit field mapped to index | codebookSubset = partialAndNonCoherent | Bit field mapped to index | codebookSubset = nonCoherent |
|---|---|---|---|---|---|
| 32 | 4 layers: TPMI = 2 | 32 | 4 layers: TPMI = 2 | | |
| 33 | 1 layers: TPMI = 12 | 33 to 63 | reserved | | |
| ... | ... | | | | |
| 48 | 1 layers: TPMI = 27 | | | | |
| 49 | 2 layers: TPMI = 14 | | | | |
| ... | ... | | | | |
| 56 | 2 layers: TPMI = 21 | | | | |
| 57 | 3 layers: TPMI = 3 | | | | |
| ... | ... | | | | |
| 60 | 3 layers: TPMI = 6 | | | | |
| 61 | 4 layers: TPMI = 3 | | | | |
| 62 | 4 layers: TPMI = 4 | | | | |
| 63 | reserved | | | | |

If the number of SRS resources is 2 and the number of SRS antenna ports include {2, 4}, then the joint encoding of SRI and precoding information and number of layers is as below.

Two SRS Resources and SRS Antenna Ports={2, 4}

The SRI can implicitly indicate the number of antenna ports. For example, SRI #0 is associated with an SRS resource with 2 antenna ports and SRI #1 is associated with an SRS resource with 4 antenna ports.

If maxRank=1 (Table 13 is introduced): for codebook subset of 'fullAndPartialAndNonCoherent', the field size is 6 bits; for codebook subset of 'partialAndNonCoherent', the field size is 4 bits; and for codebook subset of 'nonCoherent', the field size is 3 bits. If maxRank=2 or 3 or 4 (Table 14 is introduced): for codebook subset of 'fullAndPartialAndNonCoherent', the field size is 7 bits; for codebook subset of 'partialAndNonCoherent', the field size is 6 bits; and for codebook subset of 'nonCoherent', the field size is 4 bits.

TABLE 5

Joint encoding for SRI and precoding information and number of layers, for 2 SRS resource with antenna ports {2, 4}, if transform precoder is enabled, or if transform precoder is disabled and maxRank = 1

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | SRI = 0, 1 layer: TPMI = 0 | 0 | SRI = 0 | 0 | SRI = 0, 1 layer: TPMI = 0 |
| 1 | SRI = 0, 1 layer: TPMI = 1 | 1 | SRI = 1, 1 layer: TPMI = 0 | 1 | SRI = 0, 1 layer: TPMI = 1 |
| 2 | SRI = 0, 1 layer: TPMI = 2 | 2 | SRI = 1, 1 layer: TPMI = 1 | 2 | SRI = 1, 1 layer: TPMI = 0 |
| ... | ... | ... | ... | ... | ... |
| 5 | SRI = 0, 1 layer: TPMI = 5 | 5 | SRI = 1, 1 layer: TPMI = 4 | 5 | SRI = 1, 1 layer: TPMI = 3 |
| 6 | SRI = 1, 1 layer: TPMI = 0 | 6 | SRI = 1, 1 layer: TPMI = 5 | 6-7 | reserved |
| ... | ... | ... | ... | | |
| 12 | SRI = 1, 1 layer: TPMI = 6 | 12 | SRI = 1, 1 layer: TPMI = 11 | | |
| 13 | SRI = 1, 1 layer: TPMI = 7 | 13-15 | reserved | | |
| ... | ... | | | | |
| 33 | SRI = 1, 1 layers: TPMI = 27 | | | | |
| 34-63 | reserved | | | | |

TABLE 6

Joint encoding for SRI and precoding information and number of layers, for 2 SRS resource with antenna ports {2, 4}, if transform precoder is disabled and maxRank = 2 or 3 or 4

| Bit field mapped to index | codebook-Subset = fullyAndPartialAndNonCoherent | Bit field mapped to index | codebook-Subset = partialAndNonCoherent | Bit field mapped to index | codebook-Subset = nonCoherent |
|---|---|---|---|---|---|
| 0 | SRI = 0, 1 layer: TPMI = 0 | 0 | SRI = 0 | 0 | SRI = 0, 1 layer: TPMI = 0 |
| 1 | SRI = 0, 1 layer: TPMI = 1 | 1 | SRI = 1, 1 layer: TPMI = 0 | 1 | SRI = 0, 1 layer: TPMI = 1 |
| 2 | SRI = 0, 2 layers: TPMI = 0 | 2 | SRI = 1, 1 layer: TPMI = 1 | 2 | SRI = 0, 2 layers: TPMI = 0 |
| 3 | SRI = 0, 1 layer: TPMI = 2 | 3 | SRI = 1, 1 layer: TPMI = 2 | 3 | SRI = 1, 1 layer: TPMI = 0 |
| 4 | SRI = 0, 1 layer: TPMI = 3 | 4 | SRI = 1, 1 layer: TPMI = 3 | 4 | SRI = 1, 1 layer: TPMI = 1 |
| 5 | SRI = 0, 1 layer: TPMI = 4 | 5 | SRI = 1, 2 layers: TPMI = 0 | 5 | SRI = 1, 1 layer: TPMI = 2 |
| 6 | SRI = 0, 1 layer: TPMI = 5 | 6 | SRI = 1, 2 layers: TPMI = 1 | 6 | SRI = 1, 1 layer: TPMI = 3 |
| 7 | SRI = 0, 2 layers: TPMI = 1 | 7 | SRI = 1, 2 layers: TPMI = 2 | 7 | SRI = 1, 2 layers: TPMI = 0 |
| 8 | SRI = 0, 2 layers: TPMI = 2 | 8 | SRI = 1, 2 layers: TPMI = 3 | 8 | SRI = 1, 2 layers: TPMI = 1 |
| 9 | SRI = 1, 1 layer: TPMI = 0 | 9 | SRI = 1, 2 layers: TPMI = 4 | 9 | SRI = 1, 2 layers: TPMI = 2 |
| 10 | SRI = 1, 1 layer: TPMI = 1 | 10 | SRI = 1, 2 layers: TPMI = 5 | 10 | SRI = 1, 2 layers: TPMI = 3 |
| 11 | SRI = 1, 1 layer: TPMI = 2 | 11 | SRI = 1, 3 layers: TPMI = 0 | 11 | SRI = 1, 2 layers: TPMI = 4 |
| 12 | SRI = 1, 1 layer: TPMI = 3 | 12 | SRI = 1, 4 layers: TPMI = 0 | 12 | SRI = 1, 2 layers: TPMI = 5 |
| 13 | SRI = 1, 2 layers: TPMI = 0 | 13 | SRI = 1, 1 layer: TPMI = 4 | 13 | SRI = 1, 3 layers: TPMI = 0 |
| 14 | SRI = 1, 2 layers: TPMI = 1 | 14 | SRI = 1, 1 layer: TPMI = 5 | 14 | SRI = 1, 4 layers: TPMI = 0 |
| 15 | SRI = 1, 2 layers: TPMI = 2 | 15 | SRI = 1, 1 layer: TPMI = 6 | 15 | reserved |
| ... | ... | ... | ... | | |
| 18 | SRI = 1, 2 layers: TPMI = 5 | 18 | SRI = 1, 1 layer: TPMI = 9 | | |
| 19 | SRI = 1, 3 layers: TPMI = 0 | 19 | SRI = 1, 1 layer: TPMI = 10 | | |
| 20 | SRI = 1, 4 layers: TPMI = 0 | 20 | SRI = 1, 1 layer: TPMI = 11 | | |
| 21 | SRI = 1, 1 layer: TPMI = 4 | 21 | SRI = 1, 2 layers: TPMI = 6 | | |
| ... | ... | ... | ... | | |
| 28 | SRI = 1, 1 layer: TPMI = 11 | 28 | SRI = 1, 2 layers: TPMI = 13 | | |
| 29 | SRI = 1, 2 layers: TPMI = 6 | 29 | SRI = 1, 3 layers: TPMI = 1 | | |
| 30 | SRI = 1, 2 layers: TPMI = 7 | 30 | SRI = 1, 3 layers: TPMI = 2 | | |

TABLE 6-continued

Joint encoding for SRI and precoding information and number of layers, for 2 SRS resource with antenna ports {2, 4}, if transform precoder is disabled and maxRank = 2 or 3 or 4

| Bit field mapped to index | codebook-Subset = fullyAndPartialAndNonCoherent | Bit field mapped to index | codebook-Subset = partialAndNonCoherent | Bit field mapped to index | codebook-Subset = nonCoherent |
|---|---|---|---|---|---|
| 31 | SRI = 1, 2 layers: TPMI = 8 | 31 | SRI = 1, 4 layers: TPMI = 1 | | |
| 32 | SRI = 1, 2 layers: TPMI = 9 | 32 | SRI = 1, 4 layers: TPMI = 2 | | |
| 33 | SRI = 1, 2 layers: TPMI = 10 | 33 to 63 | reserved | | |
| ... | ... | | | | |
| 36 | SRI = 1, 2 layers: TPMI = 13 | | | | |
| 37 | SRI = 1, 3 layers: TPMI = 1 | | | | |
| 38 | SRI = 1, 3 layers: TPMI = 2 | | | | |
| 39 | SRI = 1, 4 layers: TPMI = 1 | | | | |
| 40 | SRI = 1, 4 layers: TPMI = 2 | | | | |
| 41 | SRI = 1, 1 layers: TPMI = 12 | | | | |
| ... | ... | | | | |
| 56 | SRI = 1, 1 layers: TPMI = 27 | | | | |
| 57 | SRI = 1, 2 layers: TPMI = 14 | | | | |
| ... | ... | | | | |
| 64 | SRI = 1, 2 layers: TPMI = 21 | | | | |
| 65 | SRI, 3 layers: TPMI = 3 | | | | |
| ... | ... | | | | |
| 68 | SRI =1, 3 layers: TPMI = 6 | | | | |
| 69 | SRI = 1, 4 layers: TPMI = 3 | | | | |
| 70 | SRI = 1, 4 layers: TPMI = 4 | | | | |
| 71-127 | reserved | | | | |

If the number of SRS resources is 3 and the number of SRS antenna ports include {1, 2, 4}, then the joint encoding of SRI and precoding information and number of layers is as below.

Two SRS Resources and SRS Antenna Ports={1, 2, 4}

The SRI can implicitly indicate the number of antenna ports. For example, SRI #0 is associated with an SRS resource with 1 antenna port, SRI #1 is associated with an SRS resource with 2 antenna ports and SRI #2 is associated with an SRS resource with 4 antenna ports.

If maxRank=1 (Table 15 is introduced): for codebook subset of 'fullAndPartialAndNonCoherent', the field size is 6 bits; for codebook subset of 'partialAndNonCoherent', the field size is 4 bits; and for codebook subset of 'nonCoherent', the field size is 3 bits. If maxRank=2 or 3 or 4 (Table 16 is introduced): for codebook subset of 'fullAndPartialAndNonCoherent', the field size is 7 bits; for codebook subset of 'partialAndNonCoherent', the field size is 6 bits; and for codebook subset of 'nonCoherent', the field size is 4 bits.

TABLE 7

Joint encoding for SRI and precoding information and number of layers, for 3 SRS resource with antenna ports {1, 2, 4}, if transform precoder is enabled, or if transform precoder is disabled and maxRank = 1

| Bit field mapped to index | codebook-Subset = fullyAndPartial-AndNonCoherent | Bit field mapped to index | codebook-Subset = partialAnd-NonCoherent | Bit field mapped to index | codebook-Subset = nonCoherent |
|---|---|---|---|---|---|
| 0 | SRI = 0 | 0 | SRI = 0 | 0 | SRI = 0 |
| 1 | SRI = 1, 1 layer: TPMI = 0 | 1 | SRI = 1 | 1 | SRI = 1, 1 layer: TPMI = 0 |
| 2 | SRI = 1, 1 layer: TPMI = 1 | 2 | SRI = 2, 1 layer: TPMI = 0 | 2 | SRI = 1, 1 layer: TPMI = 1 |
| 3 | SRI = 1, 1 layer: TPMI = 2 | 3 | SRI = 2, 1 layer: TPMI = 1 | 3 | SRI = 2, 1 layer: TPMI = 0 |
| ... | ... | ... | ... | ... | ... |
| 6 | SRI = 1, 1 layer: TPMI = 5 | 6 | SRI = 2, 1 layer: TPMI = 4 | 6 | SRI = 2, 1 layer: TPMI = 3 |
| 7 | SRI = 2, 1 layer: TPMI = 0 | 7 | SRI = 2, 1 layer: TPMI = 5 | 7 | reserved |
| ... | ... | ... | ... | | |
| 13 | SRI = 2, 1 layer: TPMI = 6 | 13 | SRI = 2, 1 layer: TPMI = 11 | | |
| 14 | SRI = 2, 1 layer: TPMI = 7 | 14-15 | reserved | | |
| ... | ... | | | | |
| 34 | SRI = 2, 1 layers: TPMI = 27 | | | | |
| 35-63 | reserved | | | | |

TABLE 8

Joint encoding for SRI and precoding information and number of layers, for 3 SRS resource with antenna ports {1, 2, 4}, if transform precoder is disabled and maxRank = 2 or 3 or 4

| Bit field mapped to index | codebook Subset = fullyAndPartial AndNonCoherent | Bit field mapped to index | codebook-Subset = partialAndNonCoherent | Bit field mapped to index | codebookSubset = nonCoherent |
|---|---|---|---|---|---|
| 0 | SRI = 0 | 0 | SRI = 0 | 0 | SRI = 0 |
| 1 | SRI = 1, 1 layer: TPMI = 0 | 1 | SRI = 1 | 1 | SRI = 1, 1 layer: TPMI = 0 |
| 2 | SRI = 1, 1 layer: TPMI = 1 | 2 | SRI = 2, 1 layer: TPMI = 0 | 2 | SRI = 1, 1 layer: TPMI = 1 |
| 3 | SRI = 1, 2 layers: TPMI = 0 | 3 | SRI = 2, 1 layer: TPMI = 1 | 3 | SRI = 1, 2 layers: TPMI = 0 |
| 4 | SRI = 1, 1 layer: TPMI = 2 | 4 | SRI = 2, 1 layer: TPMI = 2 | 4 | SRI = 2, 1 layer: TPMI = 0 |
| 5 | SRI = 1, 1 layer: TPMI = 3 | 5 | SRI = 2, 1 layer: TPMI = 3 | 5 | SRI = 2, 1 layer: TPMI = 1 |
| 6 | SRI = 1, 1 layer: TPMI = 4 | 6 | SRI = 2, 2 layers: TPMI = 0 | 6 | SRI = 2, 1 layer: TPMI = 2 |
| 7 | SRI = 1, 1 layer: TPMI = 5 | 7 | SRI = 2, 2 layers: TPMI = 1 | 7 | SRI = 2, 1 layer: TPMI = 3 |
| 8 | SRI = 1, 2 layers: TPMI = 1 | 8 | SRI = 2, 2 layers: TPMI = 2 | 8 | SRI = 2, 2 layers: TPMI = 0 |
| 9 | SRI = 1, 2 layers: TPMI = 2 | 9 | SRI = 2, 2 layers: TPMI = 3 | 9 | SRI = 2, 2 layers: TPMI = 1 |

TABLE 8-continued

Joint encoding for SRI and precoding information and number of layers, for 3 SRS resource with antenna ports {1, 2, 4}, if transform precoder is disabled and maxRank = 2 or 3 or 4

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 10 | SRI = 2, 1 layer: TPMI = 0 | 10 | SRI = 2, 2 layers: TPMI = 4 | 10 | SRI = 2, 2 layers: TPMI = 2 |
| 11 | SRI = 2, 1 layer: TPMI = 1 | 11 | SRI = 2, 2 layers: TPMI = 5 | 11 | SRI = 2, 2 layers: TPMI = 3 |
| 12 | SRI = 2, 1 layer: TPMI = 2 | 12 | SRI = 2, 3 layers: TPMI = 0 | 12 | SRI = 2, 2 layers: TPMI = 4 |
| 13 | SRI = 2, 1 layer: TPMI = 3 | 13 | SRI = 2, 4 layers: TPMI = 0 | 13 | SRI = 2, 2 layers: TPMI = 5 |
| 14 | SRI = 2, 2 layers: TPMI = 0 | 14 | SRI = 2, 1 layer: TPMI = 4 | 14 | SRI = 2, 3 layers: TPMI = 0 |
| 15 | SRI = 2, 2 layers: TPMI = 1 | 15 | SRI = 2, 1 layer: TPMI = 5 | 15 | SRI = 2, 4 layers: TPMI = 0 |
| 16 | SRI = 2, 2 layers: TPMI = 2 | 16 | SRI = 2, 1 layer: TPMI = 6 | | |
| ... | ... | ... | ... | | |
| 19 | SRI = 2, 2 layers: TPMI = 5 | 19 | SRI = 2, 1 layer: TPMI = 9 | | |
| 20 | SRI = 2, 3 layers: TPMI = 0 | 20 | SRI = 2, 1 layer: TPMI = 10 | | |
| 21 | SRI = 2, 4 layers: TPMI = 0 | 21 | SRI = 2, 1 layer: TPMI = 11 | | |
| 22 | SRI = 2, 1 layer: TPMI = 4 | 22 | SRI = 2, 2 layers: TPMI = 6 | | |
| ... | ... | ... | ... | | |
| 29 | SRI = 2, 1 layer: TPMI = 11 | 29 | SRI = 2, 2 layers: TPMI = 13 | | |
| 30 | SRI = 2, 2 layers: TPMI = 6 | 30 | SRI = 2, 3 layers: TPMI = 1 | | |
| 31 | SRI = 2, 2 layers: TPMI = 7 | 31 | SRI = 2, 3 layers: TPMI = 2 | | |
| 32 | SRI = 2, 2 layers: TPMI = 8 | 32 | SRI = 2, 4 layers: TPMI = 1 | | |
| 33 | SRI = 2, 2 layers: TPMI = 9 | 33 | SRI = 2, 4 layers: TPMI = 2 | | |
| 34 | SRI = 2, 2 layers: TPMI = 10 | 34 to 63 | reserved | | |
| ... | ... | | | | |
| 37 | SRI = 2, 2 layers: TPMI = 13 | | | | |
| 38 | SRI = 2, 3 layers: TPMI = 1 | | | | |
| 39 | SRI = 2, 3 layers: TPMI = 2 | | | | |
| 40 | SRI = 2, 4 layers: TPMI = 1 | | | | |
| 41 | SRI = 2, 4 layers: TPMI = 2 | | | | |

TABLE 8-continued

Joint encoding for SRI and precoding information and number of layers, for 3 SRS
resource with antenna ports {1, 2, 4}, if transform precoder is disabled and maxRank = 2 or 3 or 4

| Bit field mapped to index | codebook Subset = fullyAndPartial AndNonCoherent | Bit field mapped to index | codebook-Subset = partialAndNonCoherent | Bit field mapped to index | codebookSubset = nonCoherent |
|---|---|---|---|---|---|
| 42 | SRI = 2, 1 layers: TPMI = 12 | | | | |
| ... | ... | | | | |
| 57 | SRI = 2, 1 layers: TPMI = 27 | | | | |
| 58 | SRI = 2, 2 layers: TPMI = 14 | | | | |
| ... | ... | | | | |
| 65 | SRI = 2, 2 layers: TPMI = 21 | | | | |
| 66 | SRI = 2, 3 layers: TPMI = 3 | | | | |
| ... | ... | | | | |
| 69 | SRI = 2, 3 layers: TPMI = 6 | | | | |
| 70 | SRI = 2, 4 layers: TPMI = 3 | | | | |
| 71 | SRI = 2, 4 layers: TPMI = 4 | | | | |
| 72-127 | reserved | | | | |

The joint encoding of SRI and precoding information and number of layers can also be applied to SRI and the codebook subset of 'fullTxPower'. Tables 17 and 18 and show examples for the joint encoding for the SRI and the codebook subset of 'fullTxPower' for the case of 2 SRS resources with antenna ports {1, 2}. Similar encoding can be applied for other cases of the codebook subset of 'fullTxPower' depending on the number of SRS resources and combination of antenna ports.

TABLE 9

Joint encoding for codebook subset of 'fullTxPower', for 2 SRS
resource with antenna ports {1, 2}, if transform precoder is
enabled, or if transform precoder is disabled and maxRank = 1

| Bit field mapped to index | codebookSubset = fullTxPower |
|---|---|
| 0 | SRI = 0 |
| 1 | SRI = 1, 1 layer: TPMI = e1 |
| ... | ... |
| T1 | SRI = 1, 1 layer: TPMI = e1N |
| T1 + 1 – T2 | reserved |

TABLE 10

Joint encoding for codebook subset of 'fullTxPower', for 2 SRS resource with
antenna ports {1, 2}, if transform precoder is disabled and maxRank = 2

| Bit field mapped to index | codebookSubset = fullTxPower |
|---|---|
| 0 | SRI = 0 |
| 1 | SRI = 1, 1 layer: TPMI = f1 |
| ... | ... |
| U1 | SRI = 1, 1 layer: TPMI = f1N |
| U1 + 1 | SRI = 1, 2 layers: TPMI = f2 |
| ... | ... |
| U2 | SRI = 1, 2 layers: TPMI = f2N |
| U2 + 1 – U3 | reserved |

Mode 2 Operation Modification

In an embodiment, the Mode 2 operation may be modified. For example, the Mode 2 operation may be indicated by higher layer signaling (RRC or MAC signaling). If Mode 2 operation is indicated to be enabled for full power transmission, then the UE may be configured with one or multiple SRS resources with the same number of antenna ports. If the number of SRS antenna ports is one, then there is no SRI and/or TPMI field (precoding information and number of layers) in the DCI. If the number of SRS antenna ports is larger than one, since the number of SRS antenna ports is the same for the configured SRS resource, the UE may be able to determine the precise field size of the precoding information and number of layers before decoding the DCI since the SRI does not indicate the number of SRS antenna ports. This may avoid the addition of padding bits for the precoding information and number of layers or the joint encoding of the SRI and the precoding information and number of layers.

In an example, a new IE may be introduced in RRC layer, which is 'fullTxPowerMode'. The value of the IE 'fullTxPowerMode' may be 'none', 'Mode1' or 'Mode2'. The operation could be as follows according to different value: 'None'=full power transmission is not enabled in uplink. 'Mode1'=full power transmission is enabled, and Mode 1 is used for the full power transmission. The UE is configured with one or multiple SRS resources with the same number of antenna ports. A new codebook subset is used to include the TPMIs enabling full power transmission. 'Mode2'=full power transmission is enabled, and Mode 2 is used for the full power transmission. The UE is configured with one or multiple SRS resources with the same number of antenna ports. If the number of SRS antenna ports is one, there are no bits for the field of the precoding information and number of layers. If the number of SRS antenna ports is larger than one, the UE may report the TPMIs that can enable full power transmission.

The 'fullTxPowerMode' IE may be included in the PUSCH-Config defined in the RRC layer. Alternatively, if RRC signaling is used to indicate which mode is used for full power transmission, the number of SRS resources configured for the UE may be restricted to just one for both Mode 1 and Mode 2. This may avoid indicating the SRI in the DCI, i.e., the field of the SRI has zero bits.

In another example, an IE of 'Mode2Operation' may be introduced in the RRC signaling to dedicatedly indicate whether or not Mode 2 operation is enabled. That is, if the value of 'Mode2Operation' is true, then Mode 2 operation is enabled; otherwise, Mode 2 operation is disabled.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Thus, at least one of A or B, includes one or more of A, one or more of B, or one or more of A and one or more of B. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a $5^{th}$ generation NodeB (gNB), the apparatus comprising:
   processing circuitry configured to:
      determine a maximum number of antenna ports in a sounding reference signal (SRS) resource among configured SRS resources in an SRS resource set;
      set a bitwidth of a downlink control information (DCI) field for precoding information and number of layers based on the maximum number of antenna ports by inserting bits into the DCI field if the number of antenna ports is less than the maximum number of antenna ports; and
      encode, for transmission to a user equipment (UE), a physical downlink control channel (PDCCH) having a DCI that includes the DCI field; and
   memory configured to store the DCI.

2. The apparatus of claim 1, wherein the processing circuitry is further configured to encode, for transmission to the UE, Radio Resource Control (RRC) signalling indicating codebook-based physical uplink shared channel (PUSCH) transmission and the SRS resources in the SRS resource set.

3. The apparatus of claim 2, wherein the processing circuitry is further configured to encode, for transmission to the UE, RRC signalling that indicates a codebook subset selected from among "fullyAndPartialAndNonCoherent", "partialAndNonCoherent", and "noncoherent", the bitwidth of the DCI field for precoding information and number of layers dependent on the codebook subset.

4. The apparatus of claim 2, wherein the processing circuitry is further configured to encode, for transmission to the UE, RRC signalling that indicates a maximum rank, the bitwidth of the DCI field for preceding information and number of layers dependent on the maximum rank.

5. The apparatus of claim 2, wherein the processing circuitry is further configured to encode, for transmission to the UE, RRC signalling that indicates a list of SRS resource sets, each SRS resource set having a set of SRS resources with a number of antenna ports associated with the SRS resource set.

6. The apparatus of claim 1, wherein if the number of antenna ports for the configured SRS resources is less than the maximum number of antenna ports, the processing circuitry is further configured to insert a value of '0' into a number of most significant bits of the DCI field.

7. The apparatus of claim 6, wherein the bitwidth of the DCI field is dependent on UE coherence capabilities that indicate whether the UE is able to maintain a relative phase among the antenna ports over time, the UE coherence capabilities comprising full coherence in which the UE is able to maintain the relative phase among all of the antenna ports over time, partial coherence in which the UE is able to maintain the relative phase among at least one and fewer than all of the antenna ports over time, and non-coherence in which the UE is unable to maintain the relative phase among any of the antenna ports over time.

8. The apparatus of claim 6, wherein the bitwidth of the DCI field is dependent on a maximum rank of the UE.

9. A non-transitory computer-readable storage medium that stores instructions for execution by one or more processors of a $5^{th}$ generation NodeB (gNB), the instructions when executed configure the one or more processors to:
determine a maximum number of antenna ports in a sounding reference signal (SRS) resource among configured SRS resources in an SRS resource set;
set a bitwidth of a downlink control information (DCI) field for precoding information and number of layers based on the maximum number of antenna ports by inserting bits into the DCI field if the number of ports is less than the maximum number of antenna ports; and
encode, for transmission to a user equipment (UE), a physical downlink control channel (PDCCH) having a DCI that includes the DCI field.

10. The medium of claim 9, wherein the instructions when executed configure the one or more processors to encode, for transmission to the UE, Radio Resource Control (RRC) signalling indicating codebook-based physical uplink shared channel (PUSCH) transmission and the SRS resources in the SRS resource set.

11. The medium of claim 10, wherein the instructions when executed configure the one or more processors to encode, for transmission to the UE, RRC signalling that indicates a codebook subset selected from among "fullyAndPartialAndNonCoherent", "partialAndNonCoherent", and "noncoherent", the bitwidth of the DCI field for precoding information and number of layers dependent on the codebook subset.

12. The medium of claim 10, wherein the instructions when executed configure the one or more processors to encode, for transmission to the UE, RRC signalling that indicates a maximum rank, the bitwidth of the DCI field for precoding information and number of layers dependent on the maximum rank.

13. The medium of claim 10, wherein the instructions when executed configure the one or more processors to encode, for transmission to the UE, RRC signalling that indicates a list of SRS resource sets, each SRS resource set having a set of SRS resources with a number of Antenna ports associated with the SRS resource set.

14. The medium of claim 9, wherein the instructions when executed configure the one or more processors to, if the number of Antenna ports for the configured SRS resources is less than the maximum number of Antenna ports, insert a value of '0' into a number of most significant bits of the DCI field.

15. The medium of claim 14, wherein the bitwidth of the DCI field is dependent on UE coherence capabilities that indicate whether the UE is able to maintain a relative phase among the Antenna ports over time, the UE coherence capabilities comprising full coherence in which the UE is able to maintain the relative phase among all of the Antenna ports over time, partial coherence in which the UE is able to maintain the relative phase among at least one and fewer than all of the Antenna ports over time, and non-coherence in which the UE is unable to maintain the relative phase among any of the Antenna ports over time.

16. The medium of claim 14, wherein the bitwidth of the DCI field is dependent on a maximum rank of the UE.

17. A non-transitory computer-readable storage medium that stores instructions for execution by one or more processors of a user equipment (UE), the instructions when executed configure the one or more processors to:
decode, from a $5^{th}$ generation NodeB (gNB), a physical downlink control channel (PDCCH) having a downlink control information (DCI) that includes a field for precoding information and number of layers based on a maximum number of antenna ports in a sounding reference signal (SRS) resource among configured SRS resources in an SRS resource set, the field having bits inserted into the field if the number of antenna ports is less than the maximum number of antenna ports; and
encode, for transmission to the gNB, a physical uplink shared channel (PUSCH) in response to the PDCCH.

18. The medium of claim 17, wherein the instructions when executed configure the one or more processors to decode, from the gNB, Radio Resource Control (RRC) signalling indicating codebook-based physical uplink shared channel (PUSCH) transmission and the SRS resources in the SRS resource set.

19. The medium of claim 18, wherein the instructions when executed configure the one or more processors to decode, from the gNB, RRC signalling that indicates a codebook subset selected from among "fullyAndPartialAndNonCoherent", "partial AndNonCoherent", and "noncoherent", a bitwidth of the DCI field for precoding information and number of layers dependent on the codebook subset.

20. The medium of claim 19, wherein the instructions when executed configure the one or more processors to decode, from the gNB, RRC signalling that indicates a maximum rank, the bitwidth of the DCI field for precoding information and number of layers dependent on the maximum rank.

* * * * *

UNITED STATES PATENT AND TRADEMARK OFFICE
CERTIFICATE OF CORRECTION

PATENT NO. : 11,611,953 B2
APPLICATION NO. : 16/985971
DATED : March 21, 2023
INVENTOR(S) : Wang et al.

Page 1 of 1

It is certified that error appears in the above-identified patent and that said Letters Patent is hereby corrected as shown below:

In the Claims

In Column 37, Line 6, in Claim 4, delete "preceding" and insert --precoding-- therefor In Column 38, Line 54, in Claim 19, delete ""partial AndNonCoherent"," and insert --"partialAndNonCoherent",-- therefor Signed and Sealed this
Eleventh Day of June, 2024

Katherine Kelly Vidal
*Director of the United States Patent and Trademark Office*